United States Patent
Kawabata et al.

(10) Patent No.: US 6,310,169 B1
(45) Date of Patent: Oct. 30, 2001

(54) POLYMERIZABLE TERMINAL GROUP-CONTAINING POLYORGANOSILOXANE AND PRODUCTION PROCESS FOR THE SAME

(75) Inventors: Kiichi Kawabata; Youichi Kimae, both of Kumamoto (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/519,855

(22) Filed: Mar. 6, 2000

(30) Foreign Application Priority Data

Mar. 8, 1999 (JP) .................................. 11-060137

(51) Int. Cl.⁷ ........................ C08G 77/26; C08G 77/388; C08G 77/46
(52) U.S. Cl. ................ 528/28; 528/15; 528/17; 528/25; 528/26; 528/27; 528/31; 528/33; 525/474; 556/413; 556/418; 556/419; 556/420; 556/425
(58) Field of Search .................. 528/15, 17, 25, 528/26, 29, 31, 33; 525/474; 556/413, 418, 419, 420, 425

(56) References Cited

U.S. PATENT DOCUMENTS

| | | | | |
|---|---|---|---|---|
| 4,486,577 | * | 12/1984 | Mueller et al. ...................... | 525/474 |
| 4,543,398 | * | 9/1985 | Bany et al. ........................... | 525/474 |
| 4,600,751 | * | 7/1986 | Lee et al. ............................. | 525/404 |
| 4,684,538 | * | 8/1987 | Klemarczyk ......................... | 427/54.1 |
| 5,981,615 | * | 10/1999 | Meijs et al. .......................... | 522/137 |
| 5,986,018 | * | 11/1999 | Yamaguchi et al. ................. | 525/455 |
| 6,160,148 | * | 12/2000 | Dauth et al. ......................... | 556/419 |

FOREIGN PATENT DOCUMENTS

| | | |
|---|---|---|
| 59-78236 | 5/1984 | (JP) . |
| 60-110303 | 6/1985 | (JP) . |
| 5-17577 | 1/1993 | (JP) . |

\* cited by examiner

*Primary Examiner*—Robert Dawson
*Assistant Examiner*—Jeffrey B. Robertson
(74) *Attorney, Agent, or Firm*—McDermott, Will & Emery (57) ABSTRACT

The present invention relates to polymerizable terminal group-containing polyorganosiloxane having a number average molecular weight of 500 to 100000 represented by the following Formula (1):

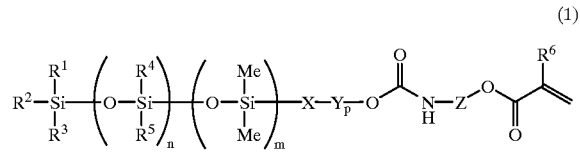

(1)

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents —OCH$_2$CH$_2$—, —OCH(CH$_3$)CH$_2$— or —OCH$_2$CH(CH$_3$)—; p represents 3 or more; and Z represents an alkylene group having 1 to 20 carbon atoms.

4 Claims, 8 Drawing Sheets

POLYMERIZABLE TERMINAL GROUP-CONTAINING POLYORGANOSILOXANE AND PRODUCTION PROCESS FOR THE SAME

BACKGROUND OF THE INVENTION

1. Field of the Invention

The present invention relates to a novel radical-polymerizable silicone and a production process for the same, specifically to polymerizable terminal group-containing polyorganosiloxane having a polyoxyalkylene segment between a polymerizable terminal group and a polysiloxane segment and a production process for the same.

2. Description of the Related Art

Subjecting cyclotrisiloxane to ring-opening polymerization with an organic lithium compound or lithium silanolate used as a polymerization initiator and then terminating the reaction with an end-capture having a radical-polymerizable functional group has so far produced a radical-polymerizable silicone. A production process disclosed in Japanese Patent Application Laid-Open No. 78236/1984 in which hexamethylcyclotrisiloxane is subjected to ring-opening polymerization with lithium trimethylsilanolate used as a polymerization initiator and then sealed with 3-(2-methacryloyloxyethoxy)propyldimethylchlorosilane can be given as an example of a production process for dialkylpolysiloxane having an acryl or methacryl group at a single terminal. Further, a production process disclosed in Japanese Patent Application Laid-Open No. 110303/1985 in which hexamethylcyclotrisiloxane is subjected to ring-opening polymerization with lithium trimethylsilanolate used as a polymerization initiator and then sealed with p-vinylphenyldimethylchlorosilane can be given as a production example for dialkylpolysiloxane having a styryl group at a single terminal.

The radical-polymerizable silicone described above can produce graft polymers by copolymerizing with various monomers. These graft polymers are used for high molecular products such as various films, plastics, rubber and waxes, surface treating agents for glass and paper and, modifiers for shampoos, rinses and hair setting agents. Thus, these products are provided with functions such as water repellency, a stain resistance, a non-adhesive property, a heat resistance, an abrasion resistance and a biocompatibility. These graft polymers have dialkylpolysiloxane bonds on side chains and do not have such problem that dialkylpolysiloxane bleeds out unlike conventional compounds obtained by merely blending dialkylpolysiloxanes.

Applications of such graft polymers having radical-polymerizable silicone include hair care products, skin care products, make-up cosmetics, water-in-oil type emulsion cosmetics, oil-in-water type emulsion cosmetics, contact lenses, glazing agents for floor, synthetic leathers, coating agents for an optical magnetic storage, magnetic paints, adhesives, water repellent finishing paints, aqueous resin emulsions, surface modifiers for a high molecular material, resin compositions for electrodeposition paint, subaqueous stain preventives for ship bottom paint and water-repellent and oil-repellent agents.

However, conventional polymerizable terminal group-containing silicones have an ester bond between a radical-polymerizable group and a polysiloxane segment and therefore are susceptible to hydrolysis, so that it is difficult to use them for a long period of time in moist atmosphere.

On the other hand, in order to solve such problem, amide bond (not ester bond) type single radical-polymerizable terminal group-containing silicones are disclosed in Japanese Patent Application Laid-Open No. 017577/1993.

However, conventional single radical-polymerizable terminal group-containing silicones including amide bond type single radical-polymerizable terminal group-containing silicones described above do not fall in a homogeneously mixed state in a certain case, and therefore it has been difficult to graft silicone depending on monomers to be copolymerized. Further, when carrying out emulsion polymerization, it has been difficult since silicone has an inferior dispersibility into water.

SUMMARY OF THE INVENTION

A subject to be solved by the present invention is to solve these problems on conventional techniques and to provide polymerizable terminal group-containing polyorganosiloxane which is less susceptible to hydrolysis.

Intensive researches repeated by the present inventors in order to solve the problems on the conventional techniques described above have resulted in finding that polymerizable terminal group-containing polyorganosiloxane which has a high compatibility with various polar solvents and monomers and which is less susceptible to hydrolysis can be obtained by introducing a polyoxyalkylene segment between a polymerizable terminal group and a polysiloxane segment, and thus they have completed the present invention based on this finding.

The polymerizable terminal group-containing polyorganosiloxane of the present invention is represented by the following items 1 to 2.

1. Polymerizable terminal group-containing polyorganosiloxane having a number average molecular weight of 500 to 100000 represented by Formula (1):

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents —$OCH_2CH_2$—, —$OCH(CH_3)CH_2$— or —$OCH_2CH(CH_3)$—; p represents 3 or more; and Z represents an alkylene group having 1 to 20 carbon atoms.

2. The polymerizable terminal group-containing polyorganosiloxane as described in the preceding item 1, wherein $R^1$, $R^3$, $R^4$ and $R^5$ are methyl; $R^2$ is n-butyl; and Z is ethylene.

A production process for the polymerizable terminal group-containing polyorganosiloxane of the present invention is represented by the following items 3 to 4.

3. A production process for polymerizable terminal group-containing polyorganosiloxane represented by Formula (1), comprising the steps of:

subjecting polyorganosiloxane represented by Formula (4) having an SiH group at a single terminal to hydrosi- lation with polyoxyalkylene represented by Formula (6) having a hydroxyl group and an alkenyl group at terminal according to the following reaction equation (a) to thereby produce a hydroxyl single terminal group-containing polyoxyalkylene.polysiloxane block copolymer represented by Formula (2), and then subjecting the block copolymer (2) obtained by the reaction described above to addition reaction with an isocyanate compound represented by Formula (3) according to the following reaction equation (b);

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents —$OCH_2CH_2$—, —$OCH(CH_3)CH_2$— or —$OCH_2CH(CH_3)$—; p represents 3 or more; and Z represents an alkylene group having 1 to 20 carbon atoms.

4. A production process for polymerizable terminal group-containing polyorganosiloxane represented by Formula (1) characterized by reacting a single terminal-hydroxyl polyoxyalkylene.polysiloxane block copolymer represented by Formula (2) with an isocyanate compound represented by Formula (3) according to the following reaction equation (b) in the presence or absence of a catalyst:

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents —$OCH_2CH_2$—, —$OCH(CH_3)CH_2$— or —$OCH_2CH(CH_3)$—; p represents 3 or more; and Z represents an alkylene group having 1 to 20 carbon atoms.

DESCRIPTION OF THE PREFERRED EMBODIMENTS

The preferred groups of $R^1$, $R^2$, $R^3$, $R^4$ and $R^5$ in Formula (1) and Formula (2) described above shall be described.

The linear or branched alkyl group having 1 to 20 carbon atoms includes methyl, ethyl, n-propyl, i-propyl, n-butyl, i-butyl, s-butyl, t-butyl, pentyl, neopentyl, hexyl, heptyl, octyl, nonyl, decyl, undecyl and dodecyl. The cycloalkyl group having 4 to 10 carbon atoms includes cyclopentyl and cyclohexyl. The aryl-containing group having 6 to 10 carbon atoms includes phenyl, toluyl, xylyl, ethylphenyl, benzyl and phenethyl.

Preferred $R^1$, $R^3$, $R^4$ and $R^5$ are methyl, and preferred $R^2$ is methyl or butyl.

The alkylene group having 2 to 20 carbon atoms represented by X in Formula (1) and Formula (2) described above includes ethylene, trimethylene, tetramethylene, pentamethylene, hexamethylene, heptamethylene, octamethylene, nonamethylene, decamethylene, undecamethylene, dodecamethylene, tetradecamethylene, 2-methylethylene, 2-methyltrimethylene, 2-methyltetramethylene, 2-methylpentamethylene, 2-methylhexamethylene, 2-methylheptamethylene, 2-methyloctamethylene, 2-methylnonamethylene, 2-methyldecamethylene and 2-methylundecamethylene.

Preferred X is alkylene having 3 carbon atoms such as trimethylene and 2-methylethylene.

In Formula (1) and Formula (3) described above, the divalent alkylene group having 1 to 20 carbon atoms represented by Z includes methylene, ethylene, trimethylene, tetramethylene, pentamethylene, hexamethylene, heptamethylene, octamethylene, nonamethylene, decamethylene, undecamethylene, dodecamethylene, tetradecamethylene, 2-methylethylene, 2-methyltrimethylene, 2-methyltetramethylene, 2-methylpentamethylene, 2-methylhexamethylene, 2-methylheptamethylene, 2-methyloctamethylene, 2-methylnonamethylene, 2-methyldecamethylene and 2-methylundecamethylene.

Preferred Z includes methylene, ethylene and trimethylene.

In Formula (1) and Formula (3) described above, the linear or branched alkyl group having 1 to 5 carbon atoms represented by $R^6$ includes methyl, ethyle n-propyl, i-propyl, n-butyl, i-butyl, s-butyl, t-butyl, pentyl and neopentyl. Further, the aryl-containing group having 10 carbon atoms or less includes phenyl, toluyl, xylyl and ethylphenyl.

Preferred $R^6$ is a hydrogen atom or methyl.

$Y_p$ represents a polyoxyalkylene segment, and p represents a polymerization degree of the polyoxyalkylene segment and shall not specifically be restricted if it is 3 or more. It is preferably 3 to 460. Y is oxyalkylene described above, and preferred Y is represented by $-OCH_2CH_2-$.

No specific restrictions shall be put if n represents 1 or more and m represents 0 or more. Further, N+m represents an average polymerization degree of the polysiloxane segment and is 4 to 1100.

The molecular weight of the polymerizable terminal group-containing polyorganosiloxane represented by Formula (1) described above shall not specifically be restricted and is preferably 500 to 100000 in terms of an average molecular weight.

The following process can produce the polymerizable terminal group-containing polyorganosiloxane represented by Formula (1) of the present invention, for example.

A single terminal-hydroxyl group-containing polyoxyalkylene.polysiloxane block copolymer (2) is obtained by hydrosilation of polyorganosiloxane (4) having an SiH group at a single terminal with polyoxyalkylene (6) having a single terminal hydroxyl group and an alkenyl group according to the following reaction equation (a).

Then, as shown in the following reaction equation (b), the block copolymer (2) obtained by the reaction described above is subjected to addition reaction with an isocyanate compound (3), whereby the polymerizable terminal group-containing polyorganosiloxane represented by Formula (1) can be produced:

Reaction equation (a)

Reaction equation (b)

wherein $R^1$, $R^2$, $R^3$, $R^4$, $R^5$, $R^6$, n, m, X, Y and p are synonymous with those described above, and X' represents an alkenyl group having 2 to 20 carbon atoms.

In the hydrosilation (reaction equation (a)) described above, a reaction solvent is not necessarily required, but a suitable solvent may be used if necessary as long as it does not prevent the reaction. To be specific, capable of being given as examples thereof are aliphatic hydrocarbon solvents such as hexane and heptane, aromatic hydrocarbon solvents such as benzene, toluene and xylene, ether solvents such as diethyl ether, tetrahydrofuran (THF) and dioxane, halogenated hydrocarbon solvents such as methylene chloride and carbon tetrachloride, alcohol solvents such as methanol, ethanol and propanol, and water. These solvents can be used as well alone or in combination of several kinds thereof.

The reaction temperature of the hydrosilation shall not specifically be restricted and is usually below the boiling point of the reaction solvent. When the reaction solvent is not used, the reaction can be carried out at 0 to 250° C. but is carried out preferably at 20 to 120° C. considering the profitability.

In the hydrosilation, a reaction catalyst may be used, and compounds containing platinum, rhodium, iridium, ruthenium, palladium, molybdenum and manganese can be given as examples of the catalysts usually used. Further, they can be used in any of a so-called homogeneous catalyst form in which they are dissolved in solvents, a carrying type catalyst form in which they are carried on carbon, silica and the like and a catalyst form in which phosphines, amines and potassium acetate are used as a promoter.

Commercially available polyethylene glycol monoallyl ether, polypropylene glycol monoallyl ether and the like can be used for the polyoxyalkylene (6) having a hydroxyl group and an alkenyl group at terminal.

For example, the following products manufactured by Nippon Oil & Fat Co., Ltd. can be shown:

"Uniox PKA-5001" (polyethylene glycol monoallyl ether having an average molecular weight of 200 in which X' is an allyl group, and Y is —$OCH_2CH_2$—);

"Uniox PKA-5002" (polyethylene glycol monoallyl ether having an average molecular weight of 400 in which X' is an allyl group, and Y is —$OCH_2CH_2$—);

"Uniox PKA-5003" (polyethylene glycol monoallyl ether having an average molecular weight of 450 in which X' is an allyl group, and Y is —$OCH_2CH_2$—)

"Uniox PKA-5004" (polyethylene glycol monoallyl ether having an average molecular weight of 750 in which X' is an allyl group, and Y is —$OCH_2CH_2$—);

"Uniox PKA-5005" (polyethylene glycol monoallyl ether having an average molecular weight of 1500 in which X' is an allyl group, and Y is —$OCH_2CH_2$—); and "Unisafe PKA-5014" (polypropylene glycol monoallyl ether having an average molecular weight of 1500 in which X' is an allyl group, and Y is —$OCH(CH_3)CH_2$— or —$OCH_2CH(CH_3)$—)

In a reaction in which the isocyanate compound (3) is added to the single terminal-hydroxyl group-containing polyoxyalkylene polysiloxane block copolymer (2) [reaction equation (b)], a conventionally known catalyst is used as a reaction catalyst, and the representative catalysts include acid catalysts such as inorganic acids, esters of phosphoric acid or boric acid and p-toluenesulfonic acid, amine catalysts such as triethylamine, N-methylmorpholine, N-ethylmorpholine, N, N-dimethylbenzylamine, N, N'-dimethylpiperadine, N,N,N',N'-tetramethylethylenediamine, N,N,N',N'-tetramethylhexamethylenediamine, N,N,N',N",N"-pentamethyldiethylenetriamine and hexamethylenetetramine, and metal complexes such as cobalt naphthenate, lead naphthenate, zinc naphthenate, stannous chloride, stannic chloride, tri-n-butyltin acetate, trimethyltin hydroxide, tetraoctyl titanate, dibutyltin laurate, tin octanoate, cobalt octanoate and antimony trichloride. They may be used alone or in combination of two or more kinds thereof.

The use amount of the above catalysts may optionally be decided by an operator and shall not specifically be restricted. In light of the profitability, it is preferably 5000 ppm or less, more preferably 500 ppm or less based on the single terminal-hydroxyl group-containing polyoxyalkylene.polysiloxane block copolymer (2).

In the reaction equation (b) which is the production process of the present invention, the single terminal-hydroxyl group-containing polyoxyalkylene.polysiloxane block copolymer of Formula (2) has usually a high viscosity, so that a solvent may be added to reduce the viscosity of the reaction mixture, whereby the reaction can sufficiently be completed. The reaction solvent therefor shall not be restricted as long as it does not prevent the reaction, and capable of being given as examples thereof are aliphatic hydrocarbon solvents such as hexane and heptane, aromatic hydrocarbon solvents such as benzene, toluene and xylene, ether solvents such as diethyl ether, tetrahydrofuran and dioxane, halogenated hydrocarbon solvents such as methylene chloride and carbon tetrachloride, and ester solvents such as ethyl acetate. These solvents can be used as well alone or in combination of a plurality thereof.

These solvents preferably contain components (water, alcohols, amines and the like) which react with the isocyanate compound in as small amounts as possible.

The isocyanate compound can be obtained in the form of commercially available products. Included is, for example, 2-methacryloxyethylisocyanate [Kalens (brand name) MOI manufactured by Showa Denko Co., Ltd.] in which Z in Formula (3) is ethylene and $R^6$ is methyl.

The reaction temperature in this addition reaction shall not specifically be restricted, and when a solvent is used in this reaction, it is preferably not higher than the boiling point of the solvent. When using no solvent, the reaction is carried out preferably at 0 to 250° C. In light of the profitability, it is carried out preferably at 20 to 120° C.

EXAMPLES

The present invention shall be explained below in detail with reference to examples, but the present invention shall not be restricted to these examples.

The following compounds and polymers were used in the examples:

2-methacryloxyethylisocyanate [Kalens (brand name) MOI manufactured by Showa Denko Co., Ltd.], polyoxyethylene having an allyl group at a single terminal ["Uniox (brand name) PKA-5001" (average molecular weight: 200) manufactured by Nippon, Oil & Fat Co., Ltd., "Uniox (brand name) PKA-5002" (average molecular weight: 400) or "Uniox (brand name) PKA-5004" (average molecular weight: 750)].

The respective physical properties were measured by the following methods. Viscosity:

Measured by means of a Canon Fenske viscometer according to JIS Z 8803 (viscosity measuring method). Water content:

Measured according to JIS K 0068 (method for measuring water content of chemicals). Specific gravity:

Measured according to JIS K 0061 (methods for measuring density and specific gravity of chemicals). Unsaturation degree:

Measured based on an iodine value according to JIS K 0070 (methods for measuring an acid value, a saponification value, an ester value, an iodine value and a hydroxyl group value of chemicals and a test method for saponified products).

The number average molecular weight and the dispersion were determined by gel permeation chromatography (GPC) calibrated with polystyrene standards, wherein the column was Shodex KF-804L×2; the column temperature was 40° C.; the detector was RI; and the mobile phase was toluene.

Example 1

(I) Preparation of Single Terminal-hydroxyl Group-containing Polyoxyalkylene.polysiloxane Block Copolymer Represented by Formula (2)

Figure 7:
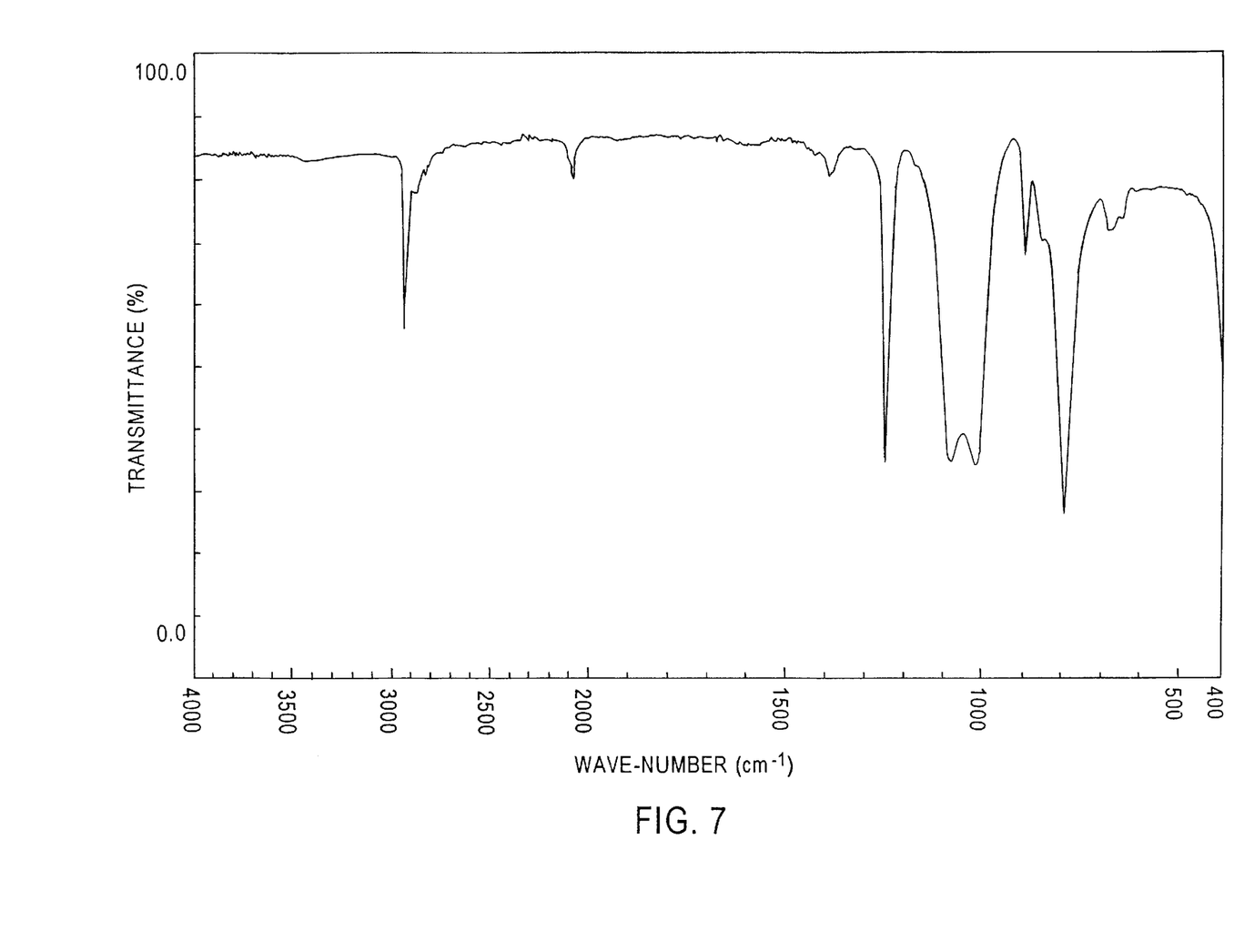
FIG. 7 is an IR spectrum of the single terminal SiH silicone prepared in Example 1-(I).

A three neck flask of 2000 ml equipped with a stirring device, a cooling tube and a thermometer was charged with 935 g of polydimethylsiloxane having a single terminal SiH group and an average molecular weight of 1000 [in Formula (4), $R^1$ and $R^3$ to $R^5$ each were methyl, $R^2$=n-butyl, m+n=13, IR spectrum (FIG. 7)], 281 g of polyoxyethylene having a single terminal allyl group and an average molecular weight of 200 [corresponding to p=4, Y=—$OCH_2CH_2$— and X'=$CH_2$=CH—$CH_2$— in Formula (6)] and 328 g of toluene and was heated up to 80° C., and 187 micro liter of a platinum catalyst was put therein. The reaction was continued at 80° C. for 5 hours, and then the reaction mixture was cooled down to distill off the solvent and volatile matters under reduced pressure by means of an evaporator. Silica gel 18 g was put therein, and stirring was continued for about one hour. Then, silica gel was filtered off to obtain 1163 g of a colorless, transparent liquid product.

Figure 8:
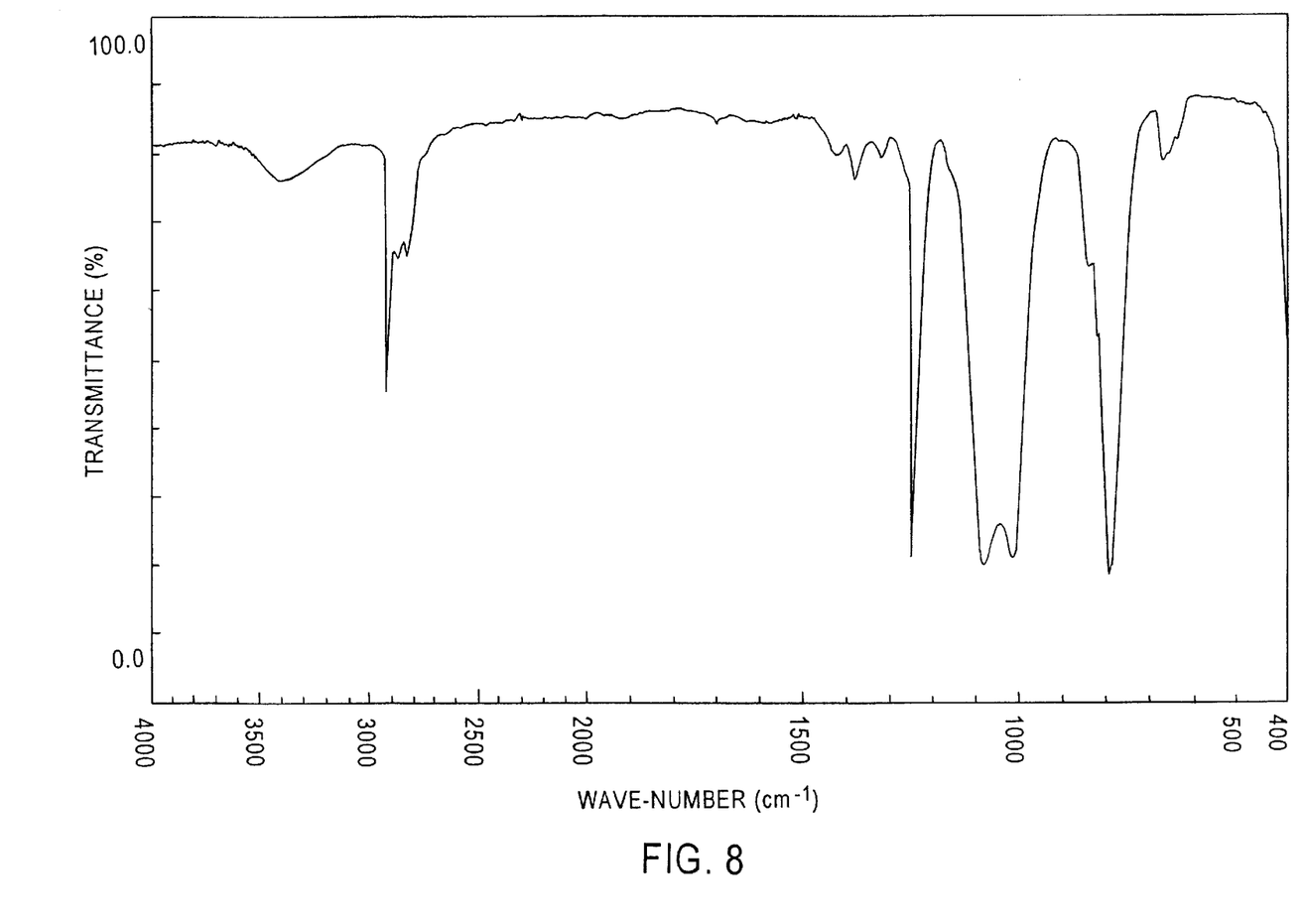
FIG. 8 is an IR spectrum of the block copolymer of Formula (2) prepared in Example 1-(I).

In an IR spectrum (FIG. 8) of this product, an absorption of SiH (2120 $cm^{-1}$) of the raw polydimethylsiloxane having a single terminal SiH group and an average molecular weight of 1000 disappeared, and an absorption of OH (3450 $cm^{-1}$) was revealed. Further, it was confirmed from an OH value of 54.7 KOH mg/g that this product was a block copolymer [in Formula (2), corresponding to $R^1$ and $R^3$ to $R^5$ which each are methyl, $R^2$=n-butyl, X=—$(CH_2)_3$—, Y=—$OCH_2CH_2$—, p=4 and m+n=13] which was composed of a polydimethylsiloxane segment having an average molecular weight of 1000 and a polyoxyethylene segment having an average molecular weight of 200.

(II) Production of Polymerizable Terminal Group-containing Polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 13.6 g of 2-methacryloxyethylisocyanate [in Formula (3), Z=$(CH_2)_2$, $R^6$=$CH_3$], 0.5 g of 2,6-di-tert-butyl-4-methylphenol and 475 micro liter of a 5.0 wt % toluene solution of dibutyltin dilaurate. This mixture was heated up to 70° C. and reacted for 6.5 hours. Then, the reaction mixture was cooled down, and volatile matters were distilled off under reduced pressure to obtain 111 g of a pale yellow, transparent liquid product.

This product had a viscosity of 78 cSt (25° C.), a moisture content of 290 ppm, a specific gravity of 1.004 ($d^{25}_4$) an unsaturation degree of 2015 g/mol, a number average molecular weight (Mn) of 1400 and a dispersion degree (Mw/Mn) of 1.29.

Figure 1:
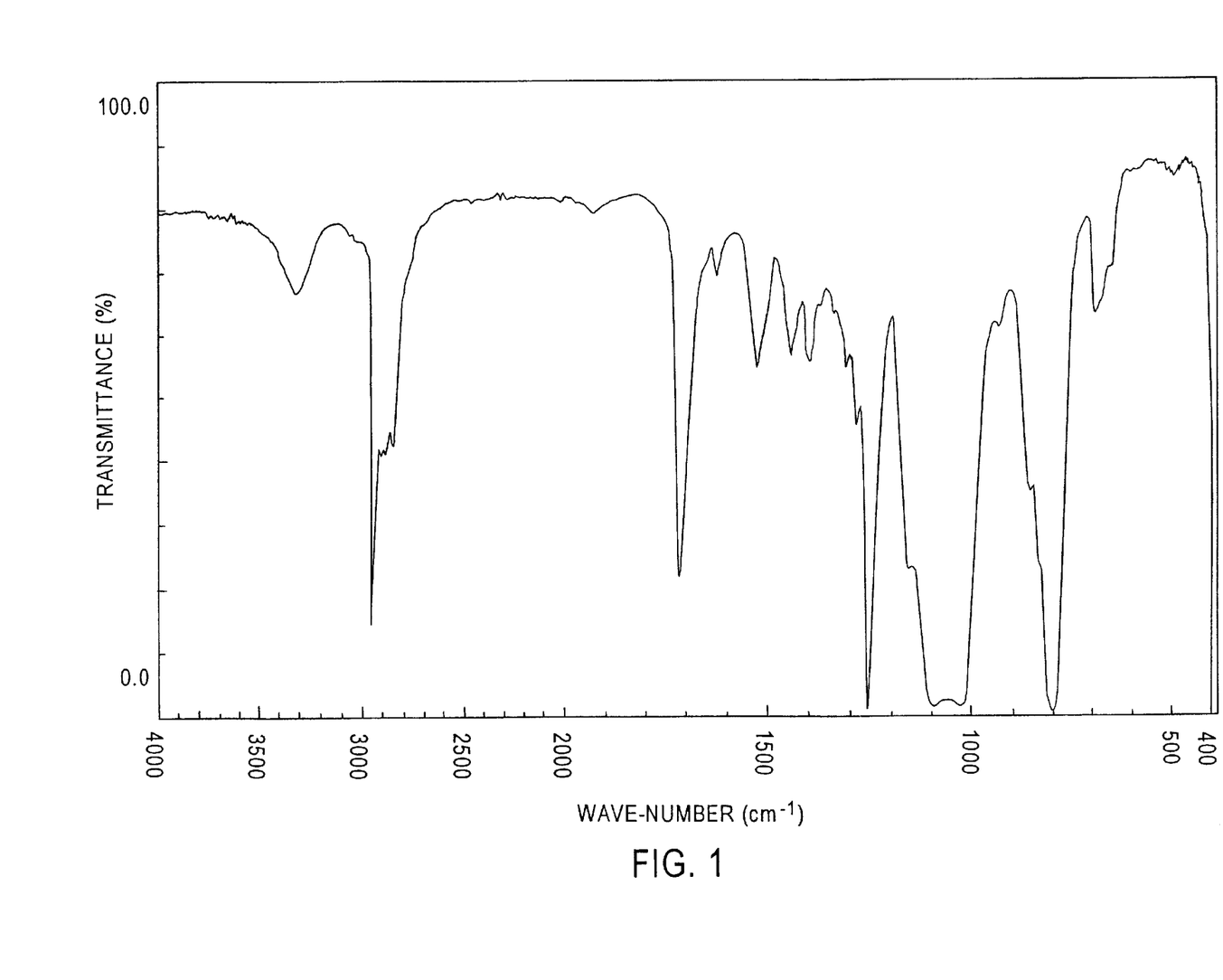
FIG. 1 is an IR spectrum of the polymerizable terminal group-containing polyorganosiloxane prepared in Example 1.
Figure 2:
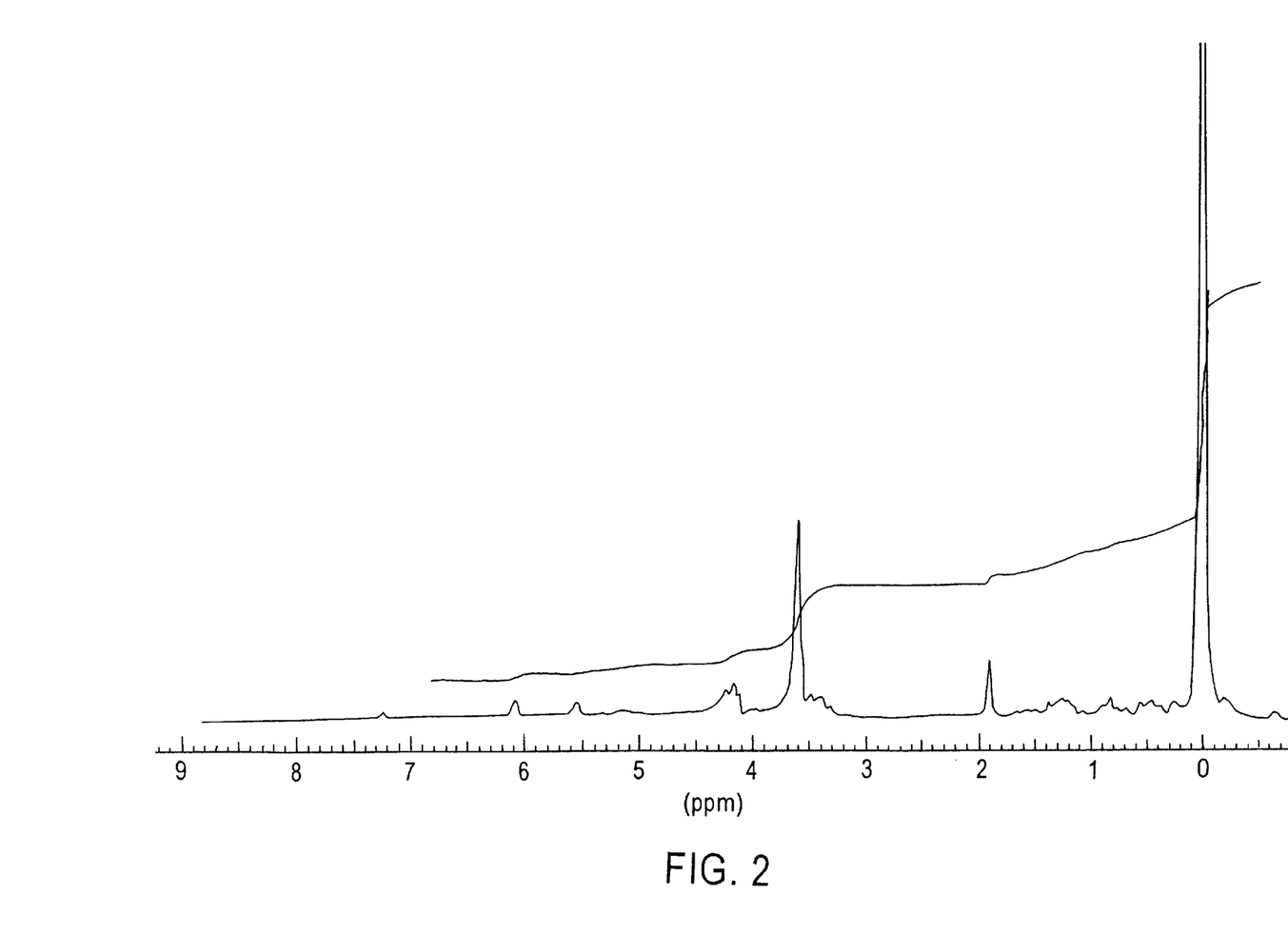
FIG. 2 is a $^1$H-NMR spectrum of the polymerizable terminal group-containing polyorganosiloxane prepared in Example 1.

Shown are an IR spectrum thereof in FIG. 1 and a $^1$H-NMR spectrum in FIG. 2. The IR spectrum of this product,showed absorptions of NH (3400 $cm^{-1}$), C=O (1720 $cm^{-1}$), C=C (1550 $cm^{-1}$), Si—O (1120–1000 $cm^{-1}$, Si—$CH_3$ (2960,1260$cm^{-1}$) and C=C (1550 $cm^{-1}$). The $^1$H-NMR spectrum showed signals of Si—$CH_3$(0.0 ppm) and $OCH_2CH_2$(3.6 ppm), and an integral ratio thereof was 4:1.

Therefore it was confirmed that the resulting product was a single terminal-methacryloxy group-containing polyoxyethylene.polydimethylsiloxane block copolymer [in Formula (1), corresponding to Z=$(CH_2)_2$, $R^6$=$CH_3$ and the others which were the same as those in the item (1) described above] which was composed of a polydimethylsiloxane segment having an average molecular weight of 1000 and a polyoxyethylene segment having an average molecular weight of 200.

Example 2

(I) Preparation of Single Terminal-hydroxyl Group-containing Polyoxyalkylene.polysiloxane Block Copolymer Represented by Formula (2)

A three neck flask of 500 ml equipped with a stirring device, a cooling tube and a thermometer was charged with 200 g of polydimethylsiloxane having a single terminal SiH group and an average molecular weight of 5000 [in Formula (4), $R^1$ and $R^3$ to $R^5$ each were methyl, $R^2$=n-butyl, m+n=67], 12 g of polyoxyethylene having a single terminal allyl group and an average molecular weight of 200 [corresponding to p=4, Y=—$OCH_2CH_2$— and X'=$CH_2$=CH—$CH_2$— in Formula (6)] and 70 g of toluene and was heated up to 80° C. for 5 hours, and then the reaction mixture was cooled down. Methanol 65 g was put therein to extract unreacted polyoxyethylene. This extraction was repeated twice, and then the solvent and volatile matters were distilled off from the toluene phase under reduced pressure by means of an evaporator to obtain 203 g of a colorless, transparent liquid product.

It was confirmed by the same analysis of IR and the like as that in Example 1-(I) that this product was a block copolymer [in Formula (2), corresponding to $R^1$ and $R^3$ to $R^5$ which each were methyl, $R^2$=n-butyl, X=—$(CH_2)_3$—, Y=—$OCH_2CH_2$, p=4 and m+n =67] which was composed of a polydimethylsiloxane segment having an average molecular weight of 5000 and a polyoxyethylene segment having an average molecular weight of 200.

(II) Production of Polymerizable Terminal Group-containing polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 3.8 g of 2-methacryloxyethylisocyanate, 0.5 g of 2,6-di-tert-butyl-4-methylphenol and 155 micro liter of a 5.0 wt % toluene solution of dibutyltin dilaurate. This mixture was heated up to 70° C. and reacted for 24 hours. Then, the reaction mixture was cooled down to obtain 104 g of a pale yellow, transparent liquid polymer.

This polymer had a viscosity of 146 cSt (25° C.), a moisture content of 110 ppm, a specific gravity of 0.983 ($d^{25}_4$), an unsaturation degree of 7937 g/mol, a number average molecular weight (Mn) of 5600 and a dispersion degree (Mw/Mn) of 1.17.

Figure 3:
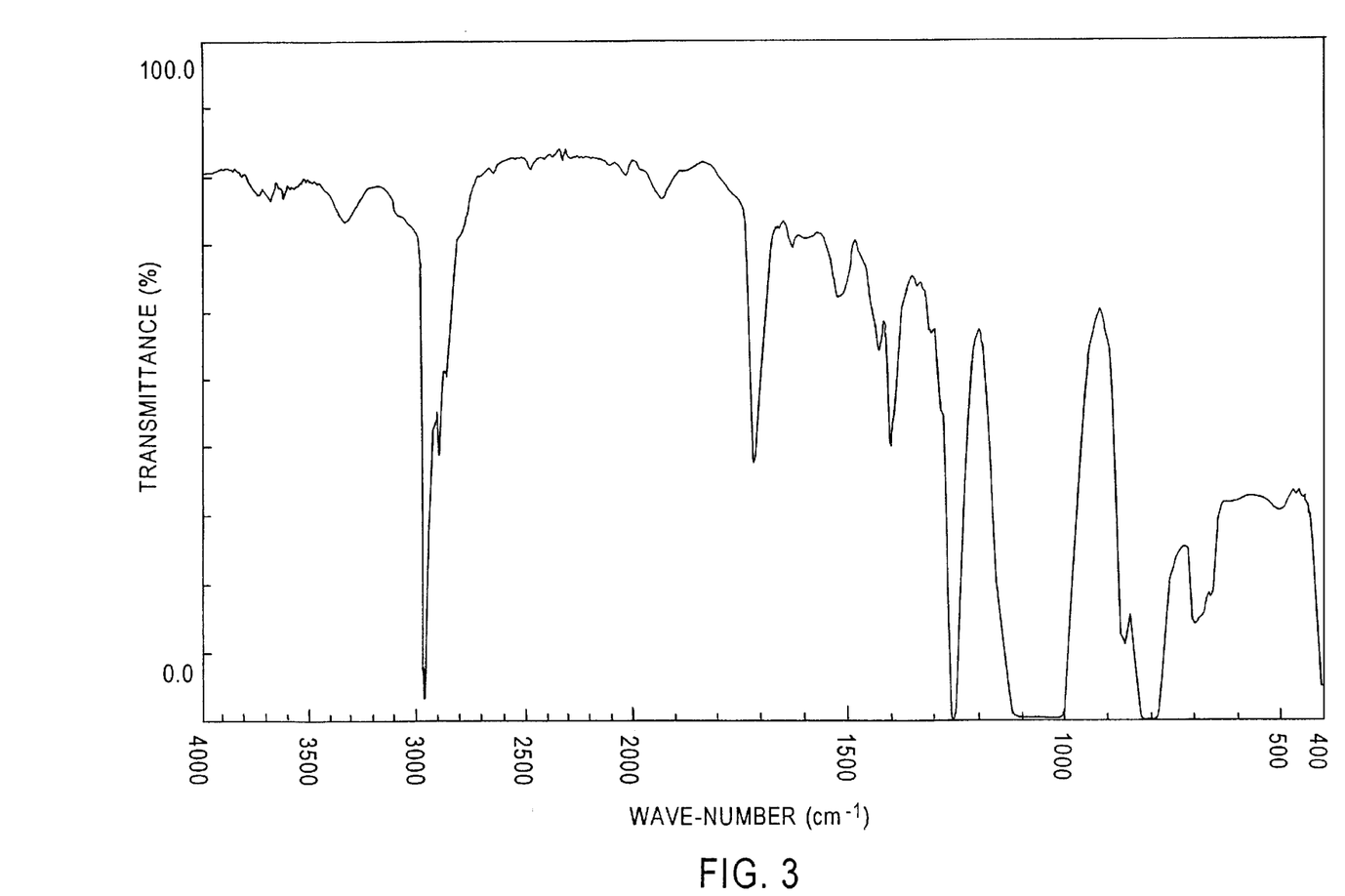
FIG. 3 is an IR spectrum of the polymerizable terminal group-containing polyorganosiloxane prepared in Example 2.
Figure 4:
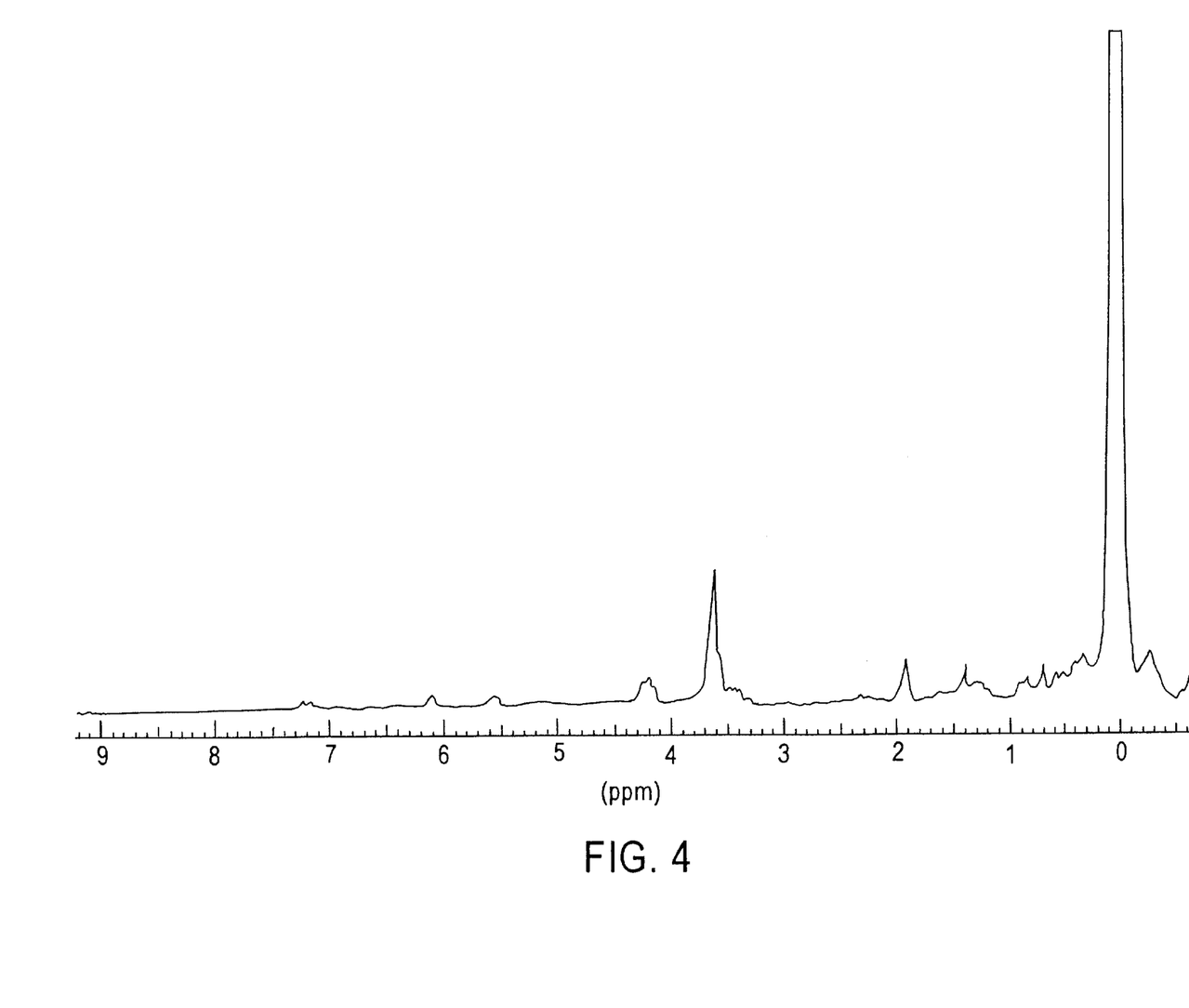
FIG. 4 is a $^1$H-NMR spectrum of the polymerizable terminal group-containing polyorganosiloxane prepared in Example 2.

Shown are an IR spectrum of this polymer in FIG. 3 and a $^1$H-NMR spectrum thereof in FIG. 4.

It was confirmed from these results that the resulting polymer was a single terminal-methacryloxy group-containing polyoxyethylene.polydimethylsiloxane block copolymer which was composed of a polydimethylsiloxane segment having a molecular weight of 5000 and a polyoxyethylene segment having an average molecular weight of 200.

Example 3

(I) Preparation of Single Terminal-hydroxyl Group-containing Polyoxyalkylene.polysiloxane Block Copolymer Represented by Formula (2)

A three neck flask of 500 ml equipped with a stirring device, a cooling tube and a thermometer was charged with 200 g of polydimethylsiloxane having a single terminal SiH group and an average molecular weight of 10000 (m+n=135, and the others were the same as those described above), 6 g of polyoxyethylene having a single terminal allyl group and an average molecular weight of 200 and 70 g of toluene and was heated up to 80° C. for 5 hours, and then the reaction mixture was cooled down. Methanol 65 g was put therein to extract unreacted polyoxyethylene. This extraction was repeated three times, and then the solvent and volatile matters were distilled off from the toulene phase under reduced pressure by means of an evaporator to obtain 188 g of a colorless transparent liquid polymer.

It was confirmed by the same analysis of IR and the like as that in Example 1-(I) that this polymer was a block copolymer which was composed of a polydimethylsiloxane segment having an average molecular weight of 10000 and a polyoxyethylene segment having an average molecular weight of 200.

(II) Production of Polymerizable Terminal Group-containing Polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 1.5 g of 2-methacryloxyethylisocyanate, 0.5 g of 2,6-di-tert-butyl-4-methylphenol and 62 micro liter of a 5.0 wt % toluene solution of dibutyltin dilaurate. This mixture was heated up to 70° C. and reacted for 20 hours. Then, the reaction mixture was cooled down to obtain 101 g of a pale yellow, transparent liquid polymer.

This polymer had a viscosity of 216 cSt (25° C.), a moisture content of 260 ppm, a specific gravity of 0.979 ($d^{25}_4$), an unsaturation degree of 12092 g/mol, a number average molecular weight (Mn) of 9800 and a dispersion degree (Mw/Mn) of 1.21.

Figure 5:
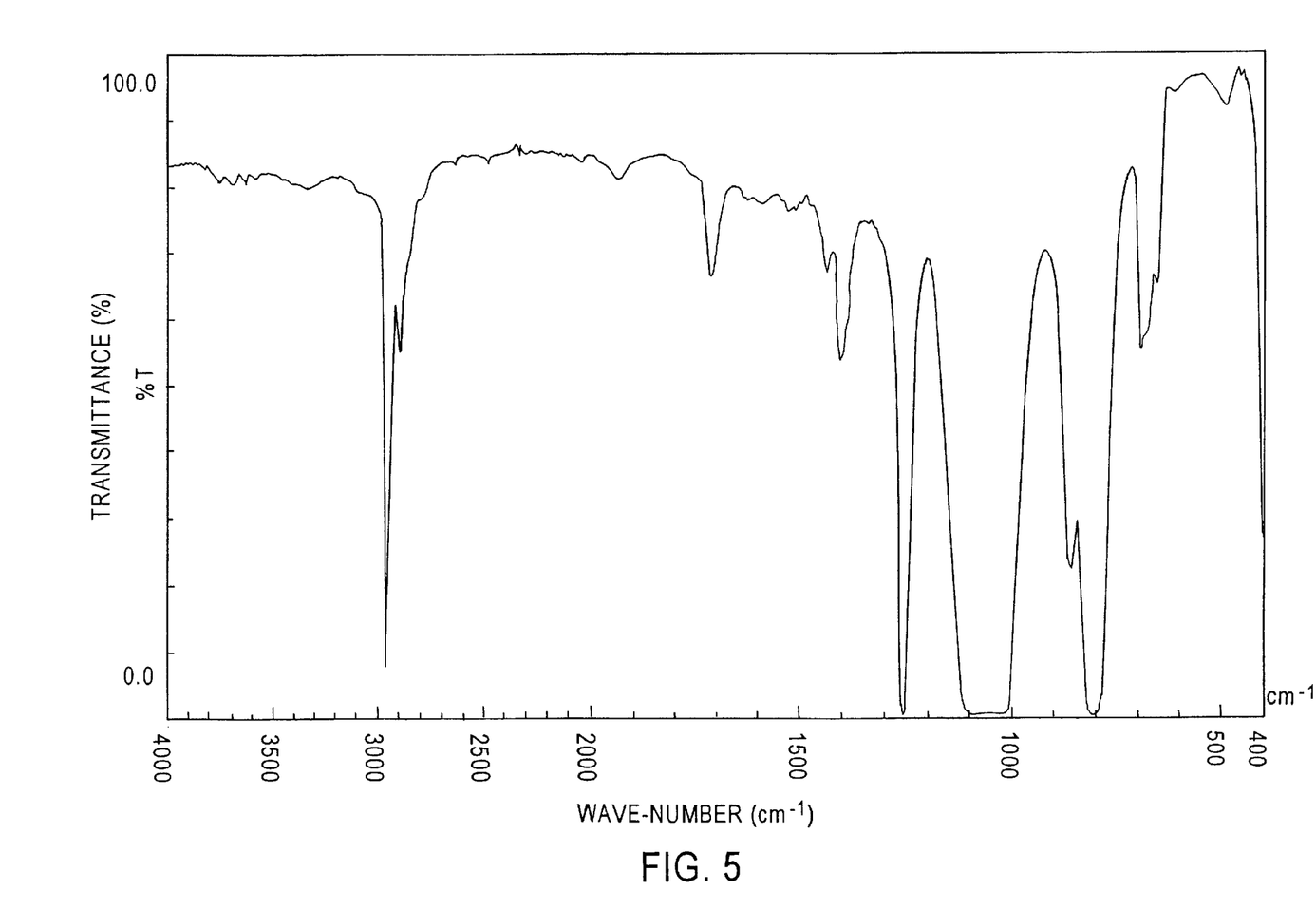
FIG. 5 is an IR spectrum of the polymerizable terminal group-containing polyorganosiloxane prepared in Example 3.
Figure 6:
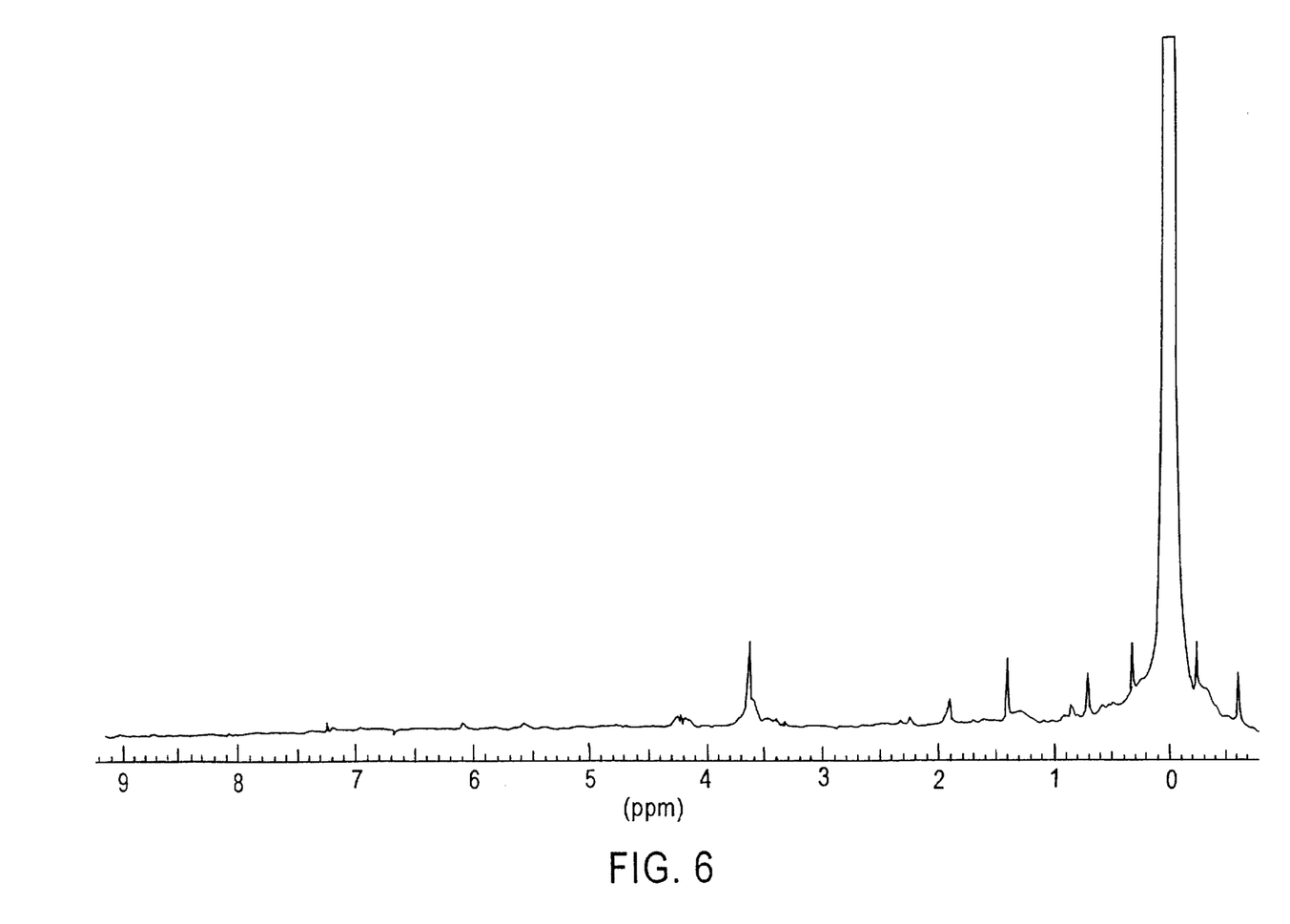
FIG. 6 is a $^1$H-NMR spectrum of the polymerizable terminal group-containing polyorganosiloxane prepared in Example 3.

Shown are an IR spectrum of this polymer in FIG. 5 and a $^1$H-NMR spectrum thereof in FIG. 6.

It was confirmed from these results that the resulting polymer was a single terminal-methacryloxy group-containing polyoxyethylene.polydimethylsiloxane block copolymer which was composed of a polydimethylsiloxane segment having an average molecular weight of 10000 and a polyoxyethylene segment having an average molecular weight of 200.

Example 4

(I) Preparation of Single Terminal-hydroxyl Group-containing Polyoxyalkylene.polysiloxane Block Copolymer Represented by Formula (2)

A three neck flask of 500 ml equipped with a magnetic stirrer, a cooling tube and a thermometer was charged with 100 g of polydimethylsiloxane having a single terminal SiH group and an average molecular weight of 5000, 13 g of polyoxyethylene having a single terminal allyl group and an average molecular weight of 400 (p=8, and the others were the same as those described above) and 170 g of toluene and was heated up to 80° C., and 11 micro liter of a platinum catalyst was put therein. The reaction was continued at 80° C. for 4 hours, and then the reaction mixture was cooled down. Methanol 210 g was put therein to extract unreacted polyoxyethylene, this extraction was repeated twice, and then the solvent and volatile matters were distilled off from the toluene phase under reduced pressure by means of an evaporator to obtain 87 g of a pale yellow, transparent liquid polymer. continued at 80° C. for 4 hours, and then the reaction mixture was cooled down. Methanol 210 g was put therein to extract unreacted polyoxyethylene. This extraction was repeated twice, and then the solvent and volatile matters were distilled off from the toluene phase under reduced pressure by means of an evaporator to obtain 87 g of a pale yellow, transparent liquid polymer.

It was confirmed by the same analysis of IR and the like as that in Example 1-(I) that this polymer was a block copolymer which was composed of a polydimethylsiloxane segment having an average molecular weight of 10000 and a polyoxyethylene segment having an average molecular weight of 200.

(II) Production of Polymerizable Terminal Group-containing Polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 2.5 g of 2-methacryloxyethylisocyanate, 0.5 g of 2,6-di-tert-butyl-4-methylphenol and 87 micro liter of a 5.9 wt % toluene solution of dibutyltin dilaurate. This mixture was heated up to 70° C. and reacted through the night. Then, the reaction mixture was cooled down to obtain 102 g of a pale yellow, transparent liquid polymer.

This polymer had a viscosity of 642 cSt (25° C.), a moisture content of 300 ppm, a specific gravity of 0.985 ($d_{254}$), an unsaturation degree of 6510 g/mol, a number average molecular weight (Mn) of 5200 and a dispersion degree (Mw/Mn) of 1.18.

An IR spectrum has absorption at same wave numbers as FIG. 1, 3 or 5 and a $^1$H-NMR spectrum has the same δ values as FIG. 2, 4 or 6.

It was confirmed from these results that the resulting polymer was a single terminal-methacryloxy group-containing polyoxyethylene.polydimethylsiloxane block copolymer which was composed of a polydimethylsiloxane segment having an average molecular weight of 5000 and a polyoxyethylene segment having an average molecular weight of 400.

Example 5

(I) Preparation of Single Terminal-hydroxyl Group-containing Polyoxyalkylene.polysiloxane Block Copolymer Represented by Formula (2)

A three neck flask of 500 ml equipped with a magnetic stirrer, a cooling tube and a thermometer was charged with 100 g of polydimethylsiloxane having a single terminal SiH group and an average molecular weight of 10000, 6 g of polyoxyethylene having a single terminal allyl group and an average molecular weight of 400 and 160 g of toluene and was heated up to 80° C., and 65 micro liter of a platinum catalyst was put therein. The reaction was continued at 80° C. for 20 hours, and then the reaction mixture was cooled down. Methanol 140 g was put therein to extract unreacted polyoxyethylene. This extraction was repeated twice, and then the solvent and volatile matters were distilled off from the toluene phase under reduced pressure by means of an evaporator to obtain 98 g of a brown, transparent liquid polymer.

It was confirmed by the same analysis of IR and the like as that in Example 1-(I) that this polymer was a block copolymer which was composed of a polydimethylsiloxane segment having an average molecular weight of 10000 and a polyoxyethylene segment having an average molecular weight of 200.

(II) Production of Polymerizable Terminal Group-containing Polyoxyalkylene.polyorganosiloxane Block Copolymer A three neck flask having an inner content of 300 ml equipped with a magnetic stirrer, a cooling tube and a thermometer was charged with 138 g of the single terminal-hydroxyl group-containing polyoxyalkylene.polysiloxane block copolymer obtained in the item (I) described above, 1.8 g of 2-methacryloxyethylisocyanate, 0.7 g of 2,6-di-tert-butyl-4-methylphenol and 60 micro liter of a 5.9 wt % toluene solution of dibutyltin dilaurate. This mixture was heated up to 70° C. and reacted for 22 hours. Then, the reaction mixture was cooled down to obtain 140 g of a pale yellow, transparent liquid polymer.

This polymer had a viscosity of 915 cSt (25° C.), a moisture content of 600 ppm, a specific gravity of 0.980 ($d^{25}_4$), an unsaturation degree of 5291 g/mol, a number average molecular weight (Mn) of 10500 and a dispersion degree (Mw/Mn) of 1.11.

An IR spectrum has absorption at same wave numbers as FIG. 1, 3 or 5 and a $^1$H-NMR spectrum has the same δ values as FIG. 2, 4 or 6.

It was confirmed from these results that the resulting polymer was a single terminal-methacryloxy group-containing polyoxyethylene.polydimethylsiloxane block copolymer which was composed of a polydimethylsiloxane segment having an average molecular weight of 10000 and a polyoxyethylene segment having an average molecular weight of 400.

Example 6
(I) Preparation of Single Terminal-hydroxyl Group-containing Polyoxyalkylene.polysiloxane Block Copolymer Represented by Formula (2)

A three neck flask of 500 ml equipped with a magnetic stirrer, a cooling tube and a thermometer was charged with 80 g of polydimethylsiloxane having a single terminal SiH group and an average molecular weight of 5000, 20 g of polyoxyethylene having a single terminal allyl group and an average molecular weight of 750 and 230 g of toluene and was heated up to 80° C., and 50 micro liter of a platinum catalyst was put therein. The reaction was continued at 80° C. for 17 hours, and then the reaction mixture was cooled down. Developed into a column charged with 50 g of silica gel were 273 g of the reaction mixture and 150 g of toluene. The solvent and volatile matters were distilled off under reduced pressure by means of an evaporator to obtain 78 g of a viscous liquid polymer.

It was confirmed by the same analysis of IR and the like as that in Example 1-(I) that this polymer was a block copolymer which was composed of a polydimethylsiloxane segment having an average molecular weight of 5000 and a polyoxyethylene segment having an average molecular weight of 750.

(II) Production of Polymerizable Terminal Group-containing polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 2.1 g of 2-methacryloxyethylisocyanate, 0.5 g of 2,6-di-tert-butyl-4-methylphenol and 72 micro liter of a 5.9 wt % toluene solution of dibutyltin dilaurate. This mixture was heated up to 70° C. and reacted for 22 hours. Then, the reaction mixture was cooled down, and the solvent and volatile matters were distilled off under reduced pressure to obtain 102 g of a pale yellow, transparent solid polymer.

This polymer had a moisture content of 210 ppm, a number average molecular weight (Mn) of 2600 and a dispersion degree (Mw/Mn) of 2.10.

It was confirmed from these results, IR and NMR spectrums that the resulting polymer was a single terminal-methacryloxy group-containing polyoxyethylene.polydimethylsiloxane block copolymer which was composed of a polydimethylsiloxane segment having an average molecular weight of 5000 and a polyoxyethylene segment having an average molecular weight of 750.

Example 7
(I) Preparation of Single Terminal-hydroxyl Group-containing Polyoxyalkylene.polysiloxane Block Copolymer Represented by Formula (2)

A three neck flask of 500 ml equipped with a magnetic stirrer, a cooling tube and a thermometer was charged with 80 g of polydimethylsiloxane having a single terminal SiH group and an average molecular weight of 10000, 15 g of polyoxyethylene having a single terminal allyl group and an average molecular weight of 750 and 250 g of toluene and was heated up to 80° C., and 30 micro liter of a platinum catalyst was put therein. The reaction was continued at 80° C. for 21 hours, and then the reaction mixture was cooled down. Methanol 140 g was put into 70 g of the reaction mixture to extract unreacted polyoxyethylene. This extraction was repeated twice, and then the solvent and volatile matters were distilled off from the toluene phase under reduced pressure by means of an evaporator to obtain 66 g of a waxy product.

It was confirmed by the same analysis of IR and the like as that in Example 1-(I) that this product was a block copolymer which was composed of a polydimethylsiloxane segment having an average molecular weight of 10000 and a polyoxyethylene segment having an average molecular weight of 750.

(II) Production of Polymerizable Terminal Group-containing Polyoxyalkylene.polyorganosiloxane Block Copolymer A three neck flask having an inner content of 300 ml equipped with a magnetic stirrer, a cooling tube and a thermometer was charged with 100 g of the single terminal-hydroxyl group-containing polyoxyalkylene.polysiloxane block copolymer obtained in the item (I) described above, 1.6 g of 2-methacryloxyethylisocyanate, 0.5 g of 2,6-di-tert-butyl-4-methylphenol, 102 g of toluene and 52 micro liter of a 5.9 wt % toluene solution of dibutyltin dilaurate. This mixture was heated up to 70° C. and reacted for 18 hours. Then, the reaction mixture was cooled down, and the solvent and volatile matters were distilled off under reduced pressure to obtain 78 g of a pale yellow, transparent solid polymer.

This polymer had a moisture content of 330 ppm, an unsaturation degree of 8460 g/mol, a number average molecular weight (Mn) of 7800 and a dispersion degree (Mw/Mn) of 1.45.

It was confirmed from these results, IR and NMR spectrums that the resulting polymer was a single terminal-methacryloxy group-containing polyoxyethylene polydimethylsiloxane block copolymer which was composed of a polydimethylsiloxane segment having an average molecular weight of 10000 and a polyoxyethylene segment having an average molecular weight of 750.

The present invention is a block copolymer having a polyoxyalkylene segment between a polymerizable terminal vinyl group and a polysiloxane segment. This polyoxyalkylene segment elevates the compatibility of the block copolymer with various polar solvents and monomers and makes it less susceptible to hydrolysis. This facilitates grafting of silicone and emulsion polymerization with a vinyl monomer.

What is claimed is:

1. Polymerizable terminal group-containing polyorganosiloxane having a number average molecular weight of 500 to 100000 represented by Formula (1):

(1)

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents $-OCH_2CH_2-$, $-OCH(CH_3)CH_2-$ or $-OCH_2CH(CH_3)-$; p represents 3 or more; and Z represents an alkylene group having 1 to 20 carbon atoms.

2. The polymerizable terminal group-containing polyorganosiloxane as described in claim 1, wherein $R^1$, $R^3$, $R^4$ and $R^5$ are methyl; $R^2$ is n-butyl; and Z is ethylene.

3. A production process for polymerizable terminal group-containing polyorganosiloxane represented by Formula (1), comprising the steps of:

subjecting polyorganosiloxane represented by Formula (4) having an SiH group at a single terminal to hydrosilation with polyoxyalkylene represented by Formula (6) having a hydroxyl group and an alkenyl group at terminal according to the following reaction equation (a) to thereby produce a single terminal-hydroxy group-containing polyoxyalkylene-polysiloxane block copolymer represented by Formula (2), and then subjecting the block copolymer (2) obtained by the reaction described above to addition reaction with an isocyanate compound represented by Formula (3) according to the following reaction equation (b);

(4)

(a)

(2)

(3)

(1)

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents $-OCH_2CH_2-$, $-OCH(CH_3)CH_2-$ or $-OCH_2CH(CH_3)-$; p represents 3 or more; and Z represents an alkylene group having 1 to 20 carbon atoms.

4. A production process for polymerizable terminal group-containing polyorganosiloxane represented by Formula (1) characterized by reacting a single terminal-hydroxyl group-containing polyoxyalkylene.polysiloxane block copolymer represented by Formula (2) with an isocyanate compound represented by Formula (3) in the presence or absence of a catalyst according to the following reaction equation (b):

(2)

(3)

(1)

wherein $R^1$, $R^2$, $R^3$, $R^4$ and $R^5$ each represent a linear or branched alkyl group having 1 to 20 carbon atoms, a cycloalkyl group having 4 to 10 carbon atoms or an aryl-containing group having 6 to 10 carbon atoms; $R^6$ represents a hydrogen atom, a linear or branched alkyl group having 1 to 5 carbon atoms or an aryl-containing group having 6 to 10 carbon atoms; n represents 1 or more and m represents 0 or more, in which n+m represents an average polymerization degree and is 4 to 1100; X represents an alkylene group having 2 to 20 carbon atoms; Y represents —OCH$_2$CH$_2$—, —OCH(CH$_3$)CH$_2$— or —OCH$_2$CH(CH$_3$)—; p represents 3 or more; and Z represents an alkylene group having 1 to 20 carbon atoms.

* * * * *